United States Patent [19]
Venn

[11] Patent Number: 5,625,813
[45] Date of Patent: Apr. 29, 1997

[54] METHOD FOR PERFORMING JOINS BETWEEN DIFFERENT RECORD TYPES IN A DATABASE SYSTEM

[75] Inventor: John L. Venn, New Barnet, England

[73] Assignee: International Computers Limited, London, England

[21] Appl. No.: 495,353

[22] Filed: Jun. 27, 1995

[30] Foreign Application Priority Data

Aug. 27, 1994 [GB] United Kingdom ............... 9417314

[51] Int. Cl.$^6$ ...................................................... G06F 17/30
[52] U.S. Cl. ............................................. 395/602; 395/603
[58] Field of Search ................................................ 395/600

[56] References Cited

U.S. PATENT DOCUMENTS

| | | | |
|---|---|---|---|
| 5,121,494 | 6/1992 | Dias et al. | 395/600 |
| 5,276,870 | 1/1994 | Shah et al. | 395/600 |
| 5,345,585 | 9/1994 | Iyer et al. | 395/600 |
| 5,412,804 | 5/1995 | Krishna | 395/600 |
| 5,423,035 | 6/1995 | DePrez | 395/600 |
| 5,495,605 | 2/1996 | Cadot | 395/600 |
| 5,546,570 | 8/1996 | McPherson et al. | 395/600 |
| 5,546,571 | 8/1996 | Shah et al. | 395/600 |
| 5,548,758 | 8/1996 | Pirahesh et al. | 395/600 |
| 5,551,031 | 8/1996 | Cheng et al. | 395/600 |

Primary Examiner—Paul V. Kulik
Attorney, Agent, or Firm—Lee, Mann, Smith, McWilliams, Sweeney & Ohlson

[57] ABSTRACT

A database system comprises a database storing a number of records of different types. The system handles database queries, involving joins between a number of different record types. Each query is first preprocessed to identify optimal starting points for accessing the records. The system then generates a data structure comprising a number of nodes, each node representing one of the record types in the query and indicating an access method for that record type. The nodes are organized into a number of chains, each having a head node representing one of the optimal starting points, and each successive node in each chain representing a record type that can be accessed from the record type represented by a preceding node in the chain by an index mechanism, a hashed access mechanism or an ownership mechanism. A virtual row of the join is constructed by accessing each of the nodes and reading a corresponding record using the specified access method. Further virtual rows are constructed by tracing a backward path through the nodes, starting from the last node in the last chain until a node is encountered for which at least one further record is available for reading from the database. Then, a forward path is traced, starting from this node, reading from the database one record of each record type represented by each node in the forward path, using the access method indicated by each node, until the last node in the last chain is reached.

7 Claims, 8 Drawing Sheets

METHOD FOR PERFORMING JOINS BETWEEN DIFFERENT RECORD TYPES IN A DATABASE SYSTEM

BACKGROUND TO THE INVENTION

This invention relates to a method for performing joins in a database system.

In general, a database comprises a number of records, each of which is of one of a number of record types, each record comprising a number of fields. The database may also contain one or more indexes, allowing records to be accessed on the value of a particular field, referred to as a key. Alternatively, the database may have a hashed access mechanism for accessing records on their keys.

Furthermore, certain database systems, referred to as hierarchic, have the concept of ownership of one record type by another. A record can own a group or set of records of a different type, and is linked to those records by a chain of pointers embedded in the records. Sometimes a local index takes the place of the pointers, but the principle is the same.

A database may be accessed by means of a query language, such as the well-known SQL (Structured Query Language). As an example, consider the following SQL query:

SELECT CUSTOMER_NAME, PRODUCT_NAME, QUANTITY
FROM CUSTOMER, ORDER
WHERE CUSTOMER.ORDER_NO= ORDER.ORDER_NO;

This assumes that the database contains two record types CUSTOMER and ORDER, the CUSTOMER record type containing fields ORDER_NO, CUSTOMER_NAME and ORDER_NO, and the ORDER record type containing fields ORDER_NO, PRODUCT_NAME and QUANTITY. The WHERE clause specifies that the ORDER_NO in the CUSTOMER record is to be equal to the ORDER_NO in the ORDER record. Execution of this example SQL query would return to the user the data items named in the SELECT clause from all pairs of CUSTOMER and ORDER records which satisfy the WHERE clause.

Because the query refers to more than one record type, the records are said to be joined. Each combination of records that satisfies the WHERE clause condition is referred to as a virtual row of the join of the two record types.

There are many ways of organising a join to produce this result. In a very primitive database system with no indexes or keys, it would be necessary to pair together all possible combinations of CUSTOMER and ORDER records, and to apply the WHERE clause to each combination to decide whether or not to return results to the user. This is referred to as forming the Cartesian product, and is very inefficient because it involves, in principle, n*m record accesses, where n is the number of records of one type and m is the number of records of the other type. For more than two record types, the number of accesses can be astronomical, unless the database is small.

If the customer record has an index of which CUSTOMER.ORDER_NO is the key, the situation is somewhat better. All the ORDER records must be read, but because they contain the key of the corresponding CUSTOMER record, it is possible to go straight to that record and avoid reading the records of customers which have no orders. In principle the number of records accessed will be 2*n, where n is the number of orders, though the actual number would vary according to the numbers of records present and the characteristics of the database. Hashed access behaves in a similar way to indexed access; these two access methods are common in relational database systems.

In a hierarchic system, customers and orders might be linked by a set, CUSTOMER being the owner and ORDER the member. The most efficient way of accessing these records would then be to access all the CUSTOMER records in turn, and follow the set pointers to the ORDER records which belong to it. The number of accesses would in principle be m*the average number of records in the set (where m is the number of customer records). This can be very efficient, especially if advantage is taken of a facility to locate member records in the same "page" or disc block as the owner record, in which case one disc access may retrieve the whole set.

The object of the invention is to provide an improved method of processing a search query involving a join, which exploits these possibilities for improving the efficiency of the join.

SUMMARY OF THE INVENTION

According to the invention in a database system comprising a database storing a plurality of records of a plurality of different record types, there is provided a method of executing a database query involving a join between a plurality of said record types, the method comprising the steps:

(a) processing the query to create a data structure comprising a plurality of nodes, linked together to form a plurality of chains, each of said nodes representing one of said data types, said processing comprising:
  (i) identifying a starting set of record types each of which contains a key that is equated to a literal in said query, or contains a field that is equated to a key of another record type in said query;
  (ii) creating a node in said data structure for each of said starting set of record types;
  (iii) identifying a further set of record types each of which can be accessed from a record type represented by an existing node; and
  (iv) creating a new node in said data structure for each of said further set of record types, and linking said new node to said existing node;

(b) constructing a virtual row of said join by accessing said nodes in sequence and, for each of said nodes, reading a record of the record type represented by that node; and (c) testing said virtual row to determine whether it satisfies said database query.

DESCRIPTION OF AN EMBODIMENT OF THE INVENTION

One embodiment of the invention will now be described by way of example with reference to the accompanying drawings.

Figure 1:
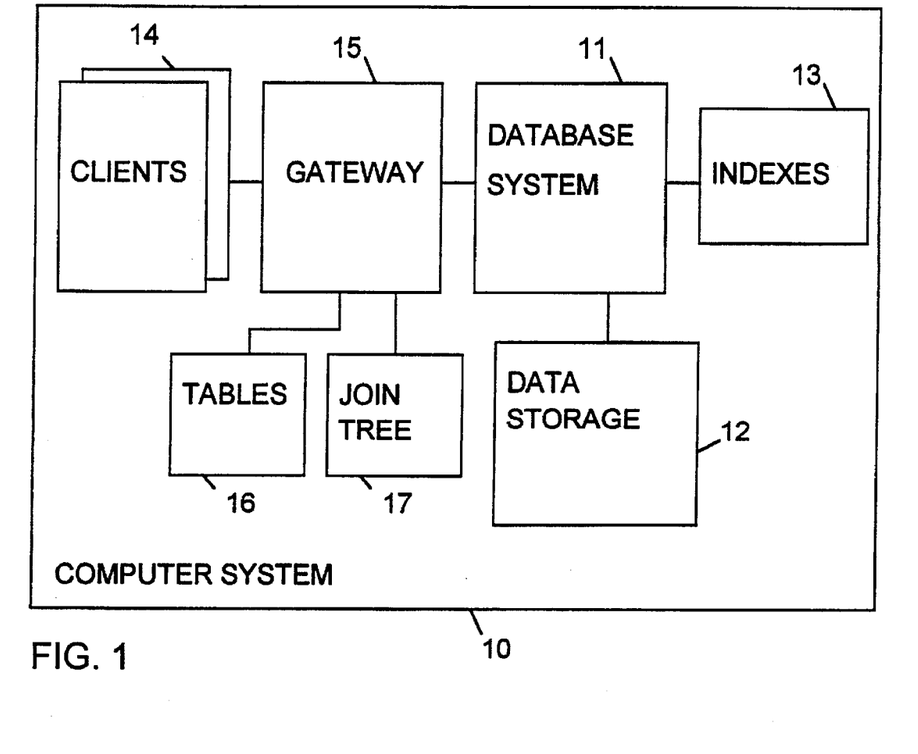
FIG. 1 is a block diagram of a computer system embodying the invention.

Referring to FIG. 1, this shows a computer system 10, including a database system 11. In this example, the database system is an IDMS database system, supplied by International Computers Limited, and running on an ICL Series 39 computer under the VME operating system. IDMS is a hierarchic database system, which uses both indexed access and also supports ownership of one record type by another. The database system 11 stores data in physical data storage 12, and maintains indexes 13.

A particular record can therefore be retrieved from the database by one of three methods:

key access, using one of the indexes.

set access, using pointers between a set owner and the set members, or between a set member and the owner of the set.

realm scan; scanning the whole of a realm to find the record. A realm is defined as an area of physical storage within the database. This is the least efficient of the methods, but is necessary where neither of the other methods is available.

The database system can be accessed by one or more clients 14, using SQL commands. An SQL query may be considered as comprising the following clauses:

SELECT: this specifies which data fields are to be retrieved from the database.

FROM: this specifies the record types from which the data is to be retrieved.

WHERE: this specifies conditions to be satisfied before the data is retrieved.

If the query involves more than one record type, it is necessary to form the join of these record types. The join consists of a number of virtual rows, each row containing a combination of data from all the record types involved in the join. As will be described, the virtual rows are constructed one at a time, in working storage, the WHERE clause being applied each virtual row in turn.

The client communicates with the database by way of a gateway 15. The gateway receives the SQL commands from the clients, and translates them into instructions in the native command language of the database system.

When it receives a query, the gateway first analyses the query, and stores it in the form of a set of easily accessible tables 16. If the query involves forming a join between two or more record types, the gateway preprocesses the query so as to construct a data structure referred to as a join tree 17. The join tree comprises a number of join nodes, one for each record type referred to in the query. A join node is a structure containing the following information about the record type:

a numeric code indicating the record type.

the method by which the record type is to be accessed (key, set member, set owner, or realm scan).

the realm of the database in which it resides.

NEXT and PREVIOUS pointers. These allow the join nodes to be linked to each other in one or more chains, to indicate the order in which the record types are to be accessed when the join is executed, so that the information in one record can be used to access the next. There can be several NEXT pointers in a join node, to allow for the possibility of forked chains.

The way in which a join tree is constructed will now be described with reference to FIGS. 2A, 2B, 3 and 4. The first loop (steps 201-204) of FIG. 2A searches the WHERE clause of the query for any record type with a key that is equated to a literal in the WHERE clause. Such record types represent good start points for the join since records of these types can be easily accessed using the appropriate index. If such a record type is found, a CREATE subroutine shown in FIG. 3 is called. The CREATE subroutine has two options: create only, and create with linking. In this case, the create only option is specified.

The CREATE subroutine creates a join node (step 301) for the record type. In this case, the join node specifies that this record type is to be accessed by key. The subroutine then checks (step 302) whether the link option has been specified. In this case, the link option was not specified and so the CREATE subroutine skips a link step (step 303) and calls a CHECK FOR SET CONNECTIONS" routine shown in FIG. 4 (step 304).

Figure 3:
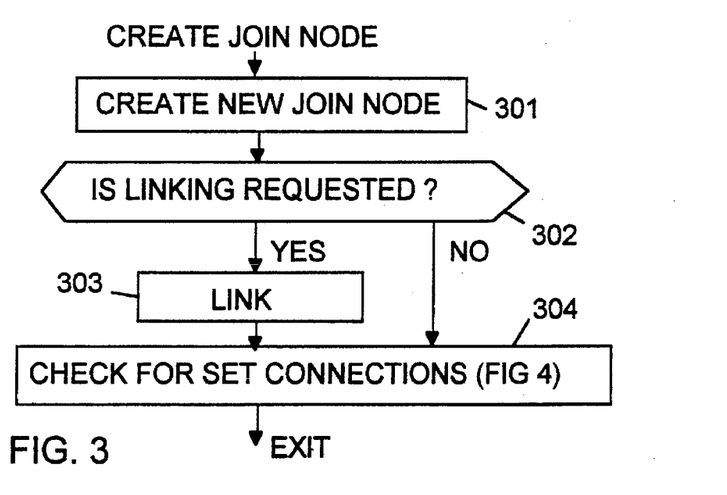
Figure 4:
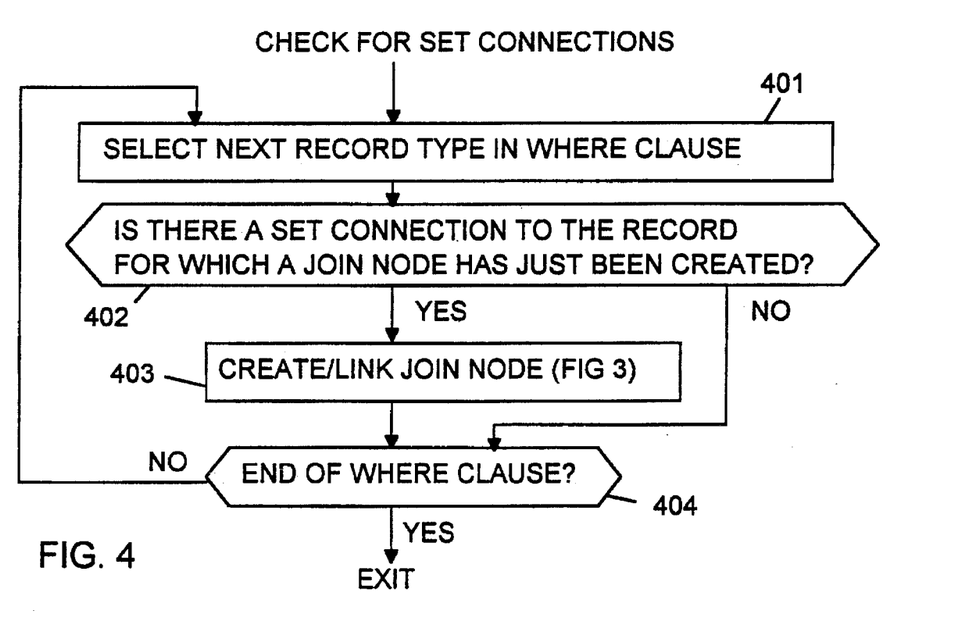

The CHECK FOR SET CONNECTIONS routine checks (step 402) each record type in the WHERE clause, to see whether that record type has a set connection (either owner-to-member or member-to-owner) to the record type for which the join node has just been created. If so, the CREATE subroutine (FIG. 3) is called recursively, in its "link" option form (step 403). Referring again to FIG. 3, the CREATE routine then creates (step 301) a join node for this record type, and then, since in this case the link option is specified, links this node to the previously created node (step 303). In this case, the join node specifies that this record is to be accessed by means of the set connection with the previously created node.

Figure 2A:
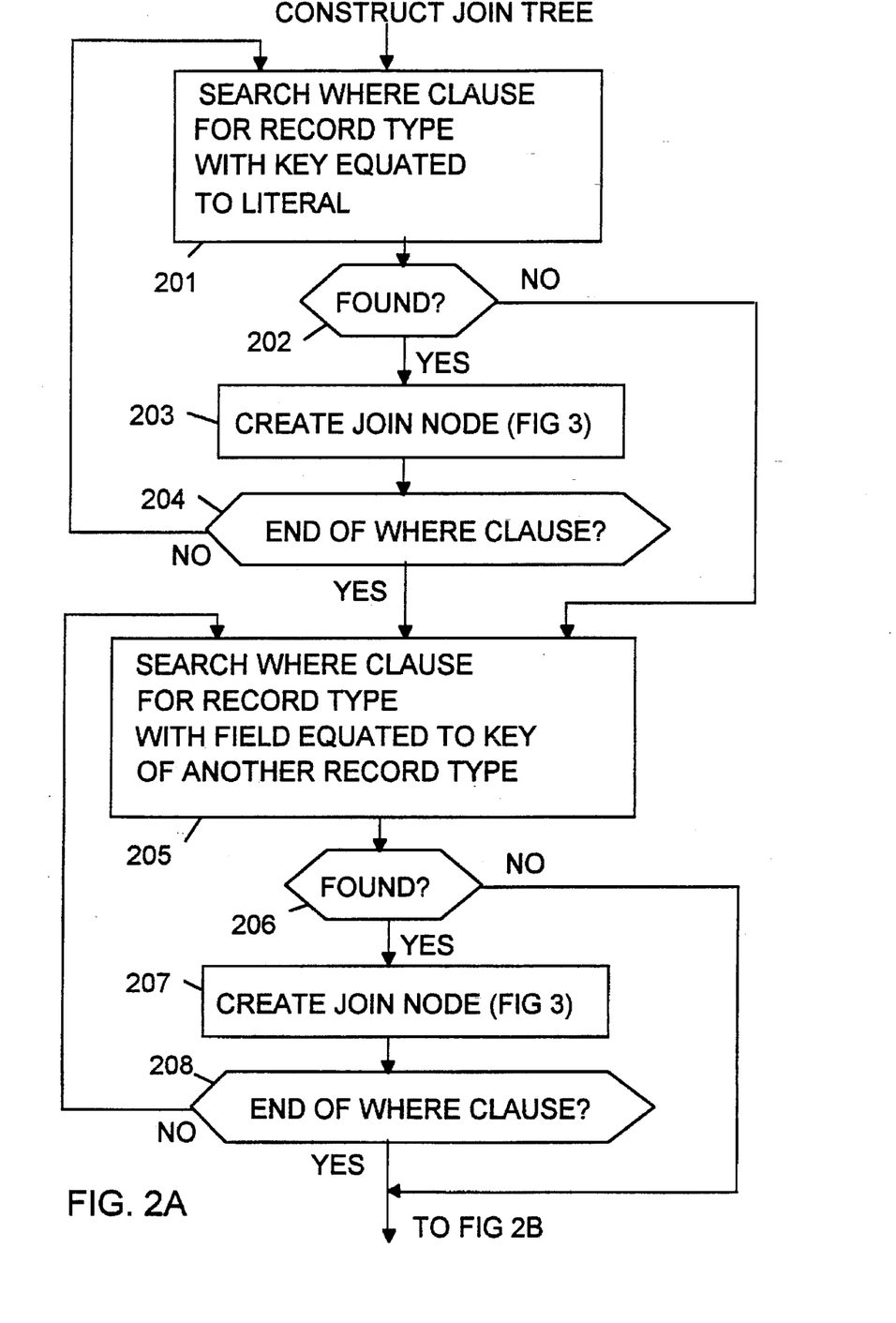
FIGS. 2A, 2B, 3 and 4 are flow charts showing a process for preprocessing a search query involving a join.

The second loop (steps 205-208) in FIG. 2A searches the WHERE clause of the query for any record type for which a join node has not yet been created, and with a field that is equated in the WHERE clause to the key of another record type. Such record types also represent good start points for the join. As before, the CREATE subroutine (FIG. 3) is called to create a join node for any such record type.

The third loop (steps 211-214) in FIG. 2B again searches the WHERE clause of the query, looking for any record type for which a join node has not yet been created, and with a key which is equated to a field in one of the record types for which a join node has previously been created. When such a record type is found, the CREATE subroutine (FIG. 3) is called, in its "link" option form, to create a join node for this record type and to link it to the previously created join node. In this case, the join node indicates that records of this type are to be accessed by key.

Figure 2B:
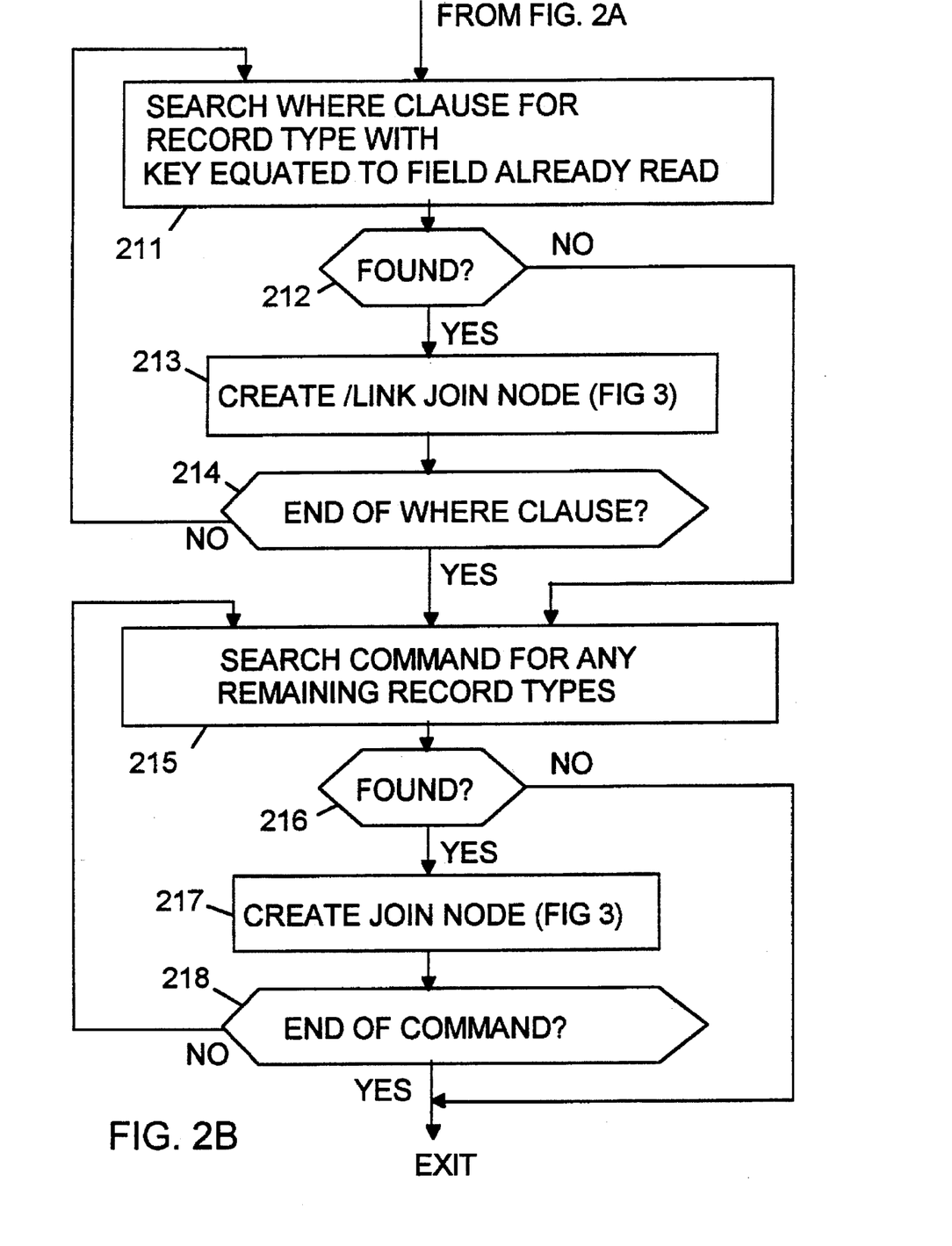

The final loop (steps 215-218) in FIG. 2 searches the command (both the FROM and WHERE clauses), looking for any record types for which join nodes have not yet been created. When one of these record types is found, the CREATE routine (FIG. 2) is called to create a join node. This join node will be unlinked, and will indicate that records of this type are to be accessed by realm scan.

Figure 5:
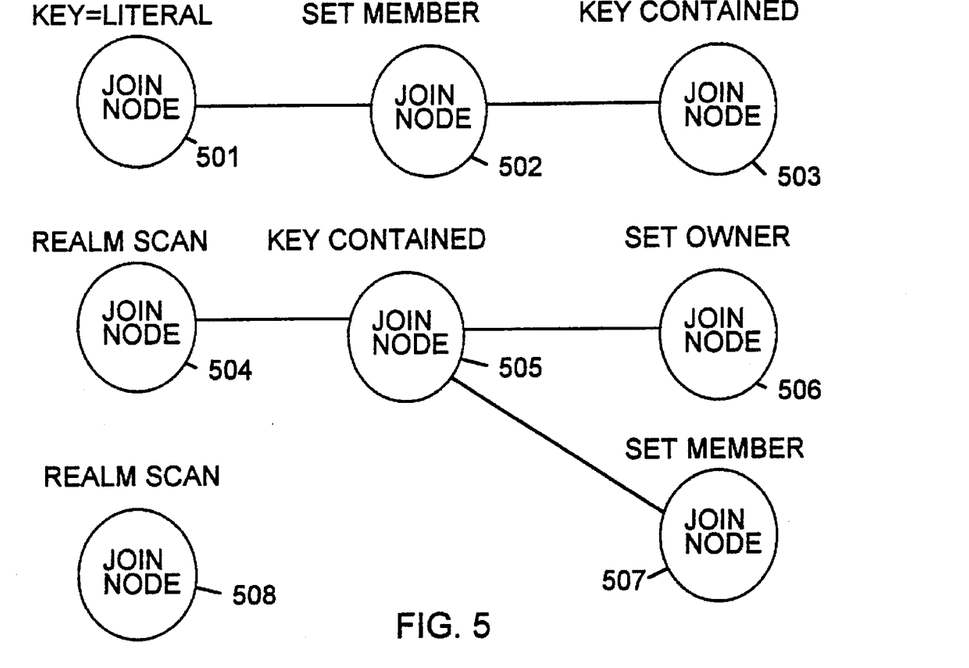
FIG. 5 is a schematic diagram showing an example of a tree structure generated by the preprocessing.

FIG. 5 shows as an example a completed set of join nodes (501-508) for a join of eight record types. In practice most joins will be of far fewer record types, frequently only one or two.

In this example, join node 501 represents a first record type with a key that is equated to a literal in the WHERE clause, and hence is a good start point for the join. Join node 502 represents a second record type that has a set member relationship to the first record type, and hence can be accessed easily from the first record type. Join node 503 represents a third record type, whose key is contained in the second record type and hence can be accessed easily from the second record type.

Join node 504 represents a fourth record type which cannot be accessed by key or set: this will be accessed by realm scan, i.e. a complete scan of the database realm in which they reside.

Join node 505 represents a fifth record type, whose key is contained in the fourth record type. Join node 506 represents a sixth record type that has a set owner relationship to the fifth record type. Join node 507 represents a seventh record type that has a set member relationship to the fifth record type.

Finally, join node 508 represents a eighth record type which cannot be accessed by key or set.

It can be seen that, in this example, the join nodes are thus linked together to form a join tree comprising three chains.

Figure 6:
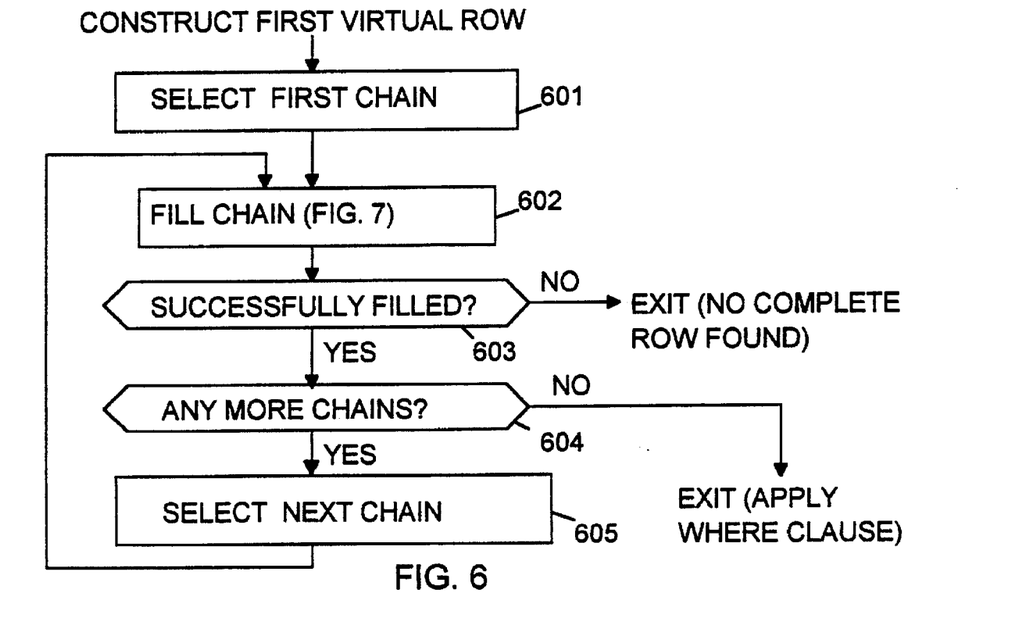
FIGS. 6 and 7 are flow charts showing a process for constructing a first virtual row of the join.

FIG. 6 shows a CONSTRUCT FIRST VIRTUAL ROW routine for constructing the first virtual row of data in a join. The routine starts from the first chain (step 601) and accesses each chain in the join tree in turn (steps 602–605). For each chain, the routine calls a FILL CHAIN subroutine (step 602).

Figure 7:
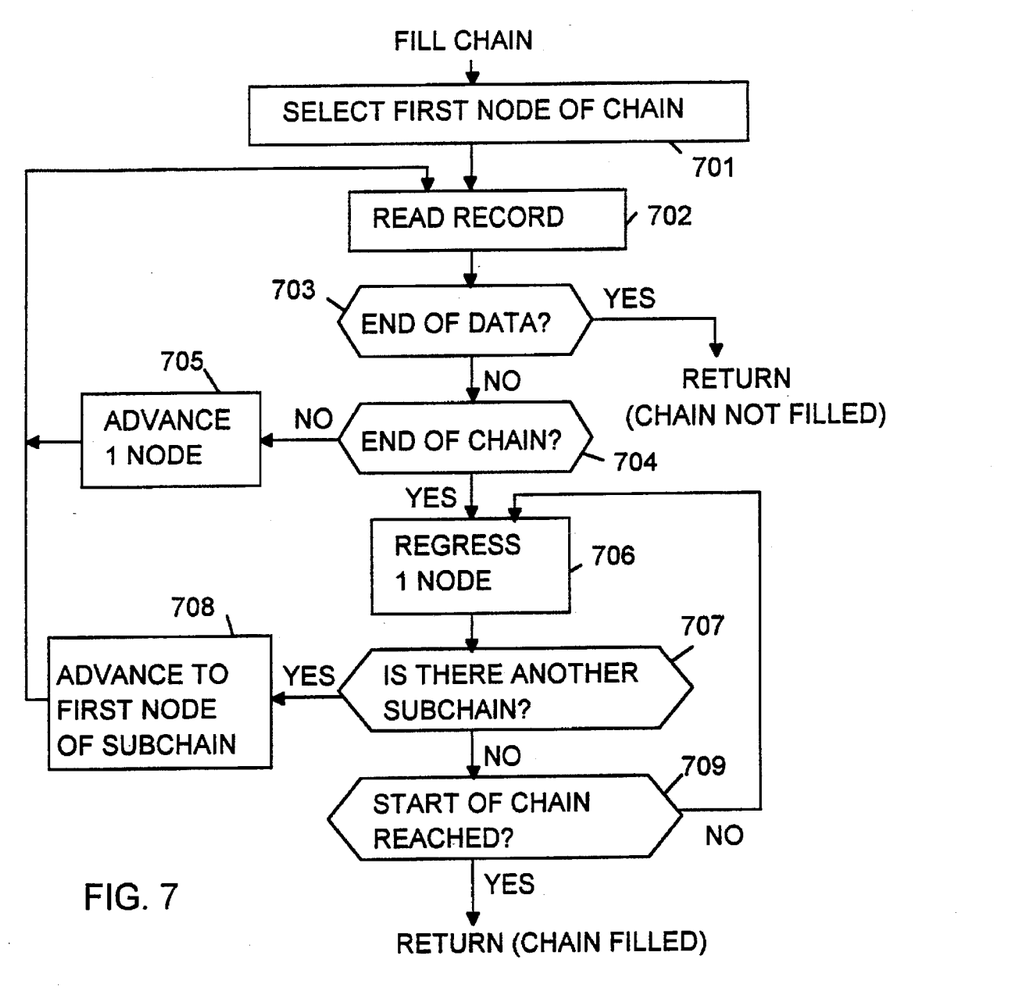

Referring to FIG. 7, the FILL CHAIN subroutine accesses each join node in the chain in turn (steps 701–709), starting from the first node of the chain. For each node, the routine accesses the database, and reads the first record of the type specified by the node into the working store (step 702), using the access method specified by the join node. When the end of the chain is reached (at step 704), the routine regresses back up the chain (step 706), and checks whether there are any other subchains branching from any of the nodes in the chain (step 707); if so, the subchain is also scanned (step 708). If the start of the chain is reached (at step 709), the subroutine returns with an indication that the chain has been successfully filled.

If, however, the end of the data is encountered (at step 703) while scanning the chain, the FILL CHAIN subroutine returns with an indication that the chain has not been successfully filled (i.e. there is insufficient data to form the join).

Referring again to FIG. 6, when the FILL CHAIN subroutine returns, the CONSTRUCT FIRST VIRTUAL ROW routine checks (step 603) whether the chain has been successfully filled and, if so, whether there are any more chains to scan (step 604). If there are more chains to scan, the routine selects the next chain, and calls the FILL CHAIN subroutine again, to process this chain. When it is detected (at step 604) that all the chains have now been successfully scanned, the construction of the first virtual row in the working store is complete. The WHERE clause can then be applied to this virtual row, to determine whether to retrieve data from it.

If on the other hand it is detected (at step 603) that the chain has not been successfully filled, the routine exits with an indication that the join is unsuccessful, because there is insufficient data to form even one virtual row.

Figure 8:
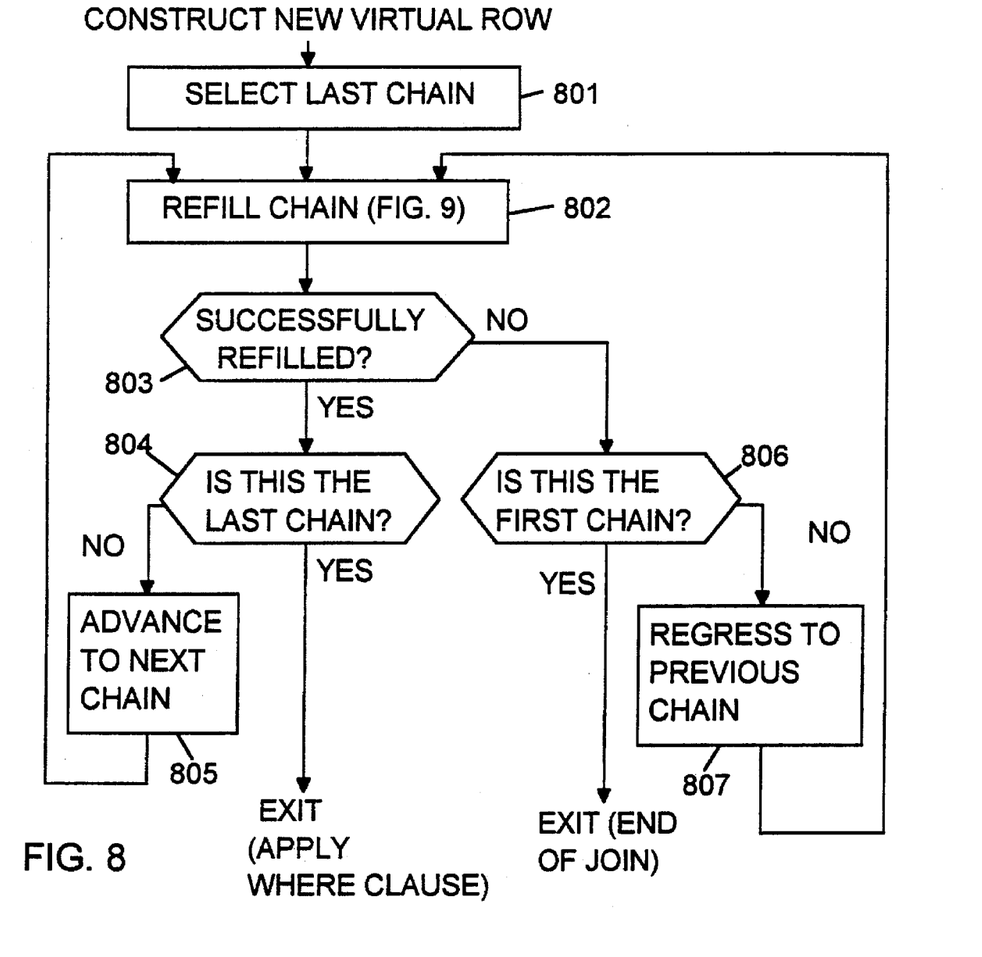
FIGS. 8 and 9 are flow charts showing a process for constructing subsequent virtual rows of the join.

FIG. 8 shows a CONSTRUCT NEW VIRTUAL ROW routine for constructing subsequent virtual rows of the join. The routine starts from the last chain (step 801), and calls a REFILL CHAIN subroutine (step 802).

Figure 9:
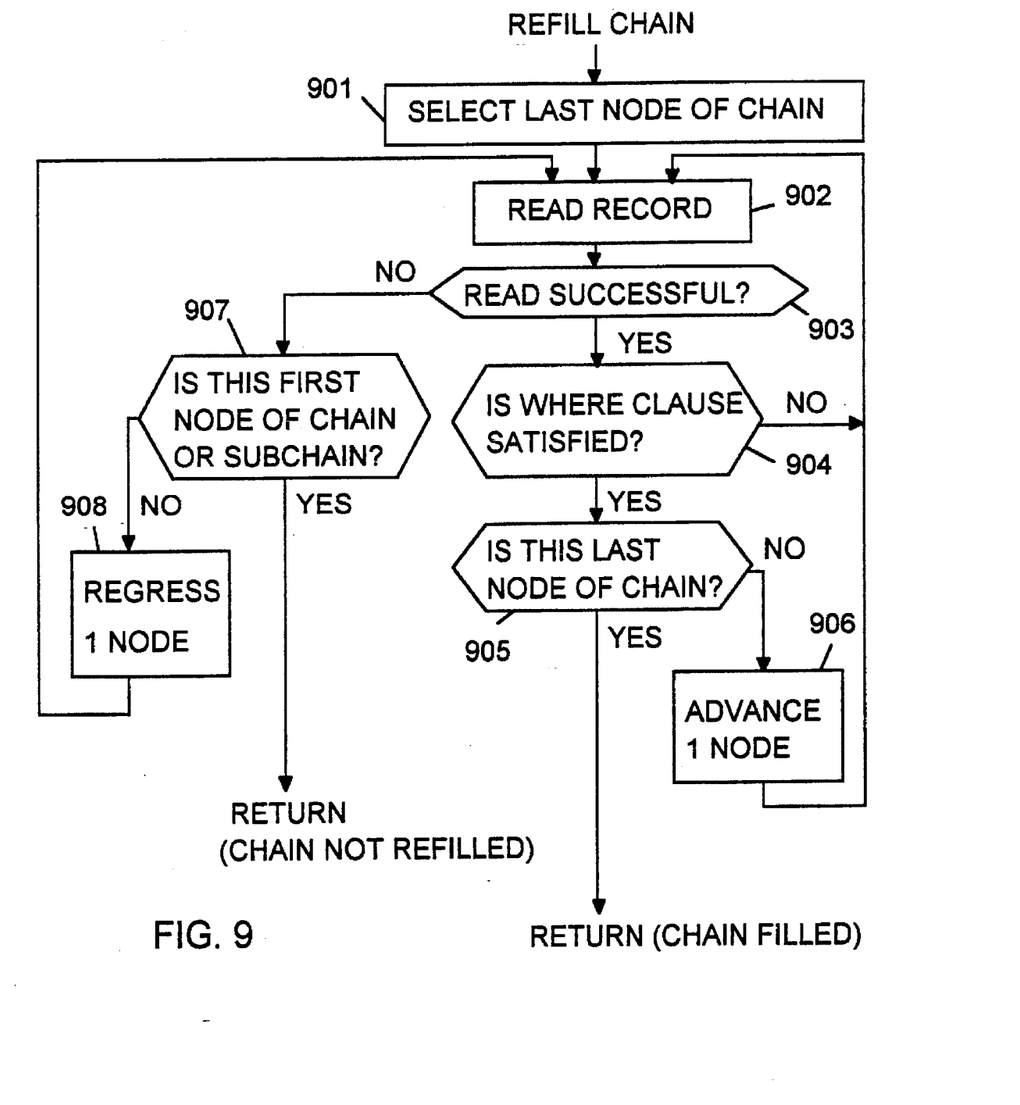

Referring to FIG. 9, the REFILL CHAIN subroutine first selects the last node in the selected chain (step 901). It then attempts to read the next record of the type specified by the current node (step 902). If a record is read successfully (step 903), it is written into the working store as part of the next virtual row of the join. The WHERE clause is then applied to the data in the working store (step 904). Note that the application of the WHERE clause here is only a partial application, as the virtual row may be incomplete at that point, and it is not applied at this point if the WHERE clause contains OR or NOT operators. If the WHERE clause is not satisfied, the current virtual row is abandoned, and the process continues, retrieving the next data record specified by the current join node (step 902). This partial application of the WHERE clause is an important performance aid since it prevents time being wasted retrieving records for a row which stands no chance of satisfying the WHERE clause.

If the partial application of the WHERE clause is satisfied, the subroutine then advances (via steps 905, 906) to the next join node (if any) in the same chain, and attempts to read another record (step 902). When the last node in a chain is reached (at step 905), the subroutine returns to the calling routine, with an indication that the chain has been successfully filled.

If it is found (at step 903) that the reading of the next record was unsuccessful, because the end of the data is reached, the subroutine regresses (via steps 907, 908) up to the previous node in this chain (if any), and again attempts to read a record. If the first node in a chain is reached (at step 907), the subroutine returns to the calling routine, with an indication that it was unable to fill the chain.

Referring again to FIG. 8, when the REFILL CHAIN subroutine returns, the CONSTRUCT NEW VIRTUAL ROW routine checks (step 803) whether the chain has been successfully refilled. If so, the routine advances (via steps 803, 804, 805) to the next chain, and again calls the REFILL CHAIN subroutine (at step 802) to process this new chain. When the last chain is successfully refilled (at step 804), the new virtual row has been successfully constructed in working store, and so the WHERE clause can now be fully applied to it to determine whether to retrieve data from that row.

If, however, it is detected (at step 803) that the chain has not been successfully refilled, the routine regresses (via steps 806, 807) to the previous chain (if any). If the first chain is reached (at step 806), without any successful retrieval, the join is finished and "end of data" is reported.

The CONSTRUCT NEW VIRTUAL ROW routine is executed repeatedly, each execution producing a new virtual row of data (i.e. a new combination of record instances) until end of data is reached. It can be seen that, on each execution, an attempt is made to retrieve a new record at the tail of the last chain. If this is successful, it is all that is required. If it is unsuccessful (because there are no more records of that type), an attempt must be made to retrieve a new record of the type that precedes it in the retrieval sequence, i.e. the type referred to in the previous node. This effect can cascade backwards until a record is successfully retrieved, and then forwards again until the virtual row is complete. When it is not possible to retrieve a record of the first type in the first chain, the join is complete.

It will be appreciated that many modifications can be made to the system described above without departing from the scope of the present invention. For example, although in the above description the database was accessible by means of indexes, the invention is equally applicable where hashed access is used. Moreover, although the system has been described in the context of a hierarchical database (IDMS in this case), it is also applicable to other types of database. Furthermore, while this example uses SQL, other query languages could be used.

I claim:

1. In a database system comprising a database storing a plurality of records of a plurality of different record types, a method of executing a database query involving a join between a plurality of said record types, the method comprising the steps:

(a) processing the query to create a data structure comprising a plurality of nodes, linked together to form a plurality of chains, each of said nodes representing one of said data types, said processing comprising:

(i) identifying a starting set of record types each of which contains a key that is equated to a literal in said query, or contains a field that is equated to a key of another record type in said query;

(ii) creating a node in said data structure for each of said starting set of record types;

(iii) identifying a further set of record types each of which can be accessed from a record type represented by an existing node; and (iv) creating a new node in said data structure for each of said further set of record types, and linking said new node to said existing node;

(b) constructing a virtual row of said join by accessing said nodes in sequence and, for each of said nodes, reading a record of the record type represented by that node; and (c) testing said virtual row to determine whether it satisfies said database query.

2. A method according to claim 1 including constructing a further virtual row of said join, by further steps as follows:

(a) tracing a backward path through said nodes, starting from a last node in a last of said chains and regressing backwards up each chain and from each chain to a preceding chain, until a node is encountered that represents a record type for which at least one further record is available for reading from the database; and then (b) tracing a forward path through said nodes, starting from said node that represents a record type for which at least one further record is available for reading from the database, and advancing forwards down each chain and from each chain to a next chain, reading from the database one record of each record type represented by each node in said forward path, until the last node in the last of said chains is reached.

3. A method according to claim 1 wherein, when each record is read, a condition specified by the query is partially applied to the virtual row being constructed, to determine whether to continue construction of that row.

4. In a database system comprising a database storing a plurality of records of a plurality of different record types, a method of executing a database query involving a join between a plurality of said record types, the method comprising the steps:

(a) processing the query to create a data structure comprising a plurality of nodes, linked together to form a plurality of chains, each of said nodes representing one of said data types, said processing comprising:

(i) identifying a first set of record types each of which contains a key that is equated to a literal in said query, and creating a node in said data structure for each of said first set of record types;

(ii) identifying a second set of record types each of which contains a field that is equated in said query to the key of another record type, and creating a node in said data structure for each of said second set of record types;

(iii) identifying a third set of record types each of which contains a key that is equated in said query to a field of a record type represented by an existing node, and creating a new node in said data structure for each of said third set of record types and linking said new node to said existing node;

(b) constructing a virtual row of said join by accessing said nodes in sequence and, for each of said nodes, reading a record of the record type represented by that node; and (c) testing said virtual row to determine whether it satisfies said database query.

5. A method according to claim 4 including constructing a further virtual row of said join, by further steps as follows:

(a) tracing a backward path through said nodes, starting from a last node in a last of said chains and regressing backwards up each chain and from each chain to a preceding chain, until a node is encountered that represents a record type for which at least one further record is available for reading from the database; and then (b) tracing a forward path through said nodes, starting from said node that represents a record type for which at least one further record is available for reading from the database, and advancing forwards down each chain and from each chain to a next chain, reading from the database one record of each record type represented by each node in said forward path, until the last node in the last of said chains is reached.

6. A method according to claim 4 wherein the step of processing the query further includes:

(i) identifying a fourth set of record types each of which can be accessed from a record type identified by an already-created node by means of a set connection, and (ii) for each of said fourth set of record types, creating a new node in said data structure representing that record type and linking said new node to said already-created node.

7. A database system comprising:

(a) a database storing a plurality of records of a plurality of different record types;

(b) means for generating a database query involving a join between a plurality of said record types;

(c) means for processing the query to create a data structure comprising a plurality of nodes, linked together to form a plurality of chains, each of said nodes representing one of said data types, said processing means comprising:

(i) means for identifying a starting set of record types each of which contains a key that is equated to a literal in said query, or contains a field that is equated to a key of another record type in said query;

(ii) means for creating a node in said data structure for each of said starting set of record types;

(iii) means for identifying a further set of record types each of which can be accessed from a record type represented by an existing node; and (iv) means for creating a new node in said data structure for each of said further set of record types, and linking said new node to said existing node;

(d) means for constructing a virtual row of said join by accessing said nodes in sequence and, for each of said nodes, reading a record of the record type represented by that node; and (e) means for testing said virtual row to determine whether it satisfies said database query.

* * * * *